United States Patent
Bergström et al.

(12)

(10) Patent No.: US 7,017,734 B2
(45) Date of Patent: Mar. 28, 2006

(54) APPARATUS AND A METHOD FOR MARSHALLING OUT INDIVIDUAL OBJECTS FROM A ROW OF OBJECTS

(75) Inventors: Mats Bergström, Kavlinge (SE); Hans Johansson, Uddevalla (SE); Arild Larsen, Rabbalshede (SE); Ingvar Mårtensson, Genarp (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 50 days.

(21) Appl. No.: 10/467,306

(22) PCT Filed: Feb. 7, 2002

(86) PCT No.: PCT/SE02/00215

§ 371 (c)(1),
(2), (4) Date: Jun. 3, 2004

(87) PCT Pub. No.: WO02/064431

PCT Pub. Date: Aug. 22, 2002

(65) Prior Publication Data

US 2004/0206604 A1    Oct. 21, 2004

(30) Foreign Application Priority Data

Feb. 9, 2001    (SE) ................................ 0100433

(51) Int. Cl.
*B65G 25/00*    (2006.01)

(52) U.S. Cl. .................... 198/745; 198/746; 198/463.4; 198/468.11

(58) Field of Classification Search ............. 198/459.6, 198/745, 463.4, 746, 468.1, 468.11
See application file for complete search history.

(56) References Cited

U.S. PATENT DOCUMENTS

| 1,924,964 A | | 8/1933 | Smith |
| 2,933,180 A | * | 4/1960 | Dixon et al. ................. 198/745 |
| 3,390,509 A | | 7/1968 | Kamp |
| 3,483,963 A | * | 12/1969 | Denlinger et al. ........ 198/463.4 |

(Continued)

FOREIGN PATENT DOCUMENTS

EP    0765810    4/1997

(Continued)

*Primary Examiner*—Joseph E. Valenza
(74) *Attorney, Agent, or Firm*—Buchanan Ingersoll

(57) ABSTRACT

The invention relates to an apparatus and a method for marshalling out individual objects (1) from a row of such objects (1). The apparatus includes two pusher arms (8) placed one on each side of the row of objects (1). The apparatus also includes two arrest pins (20, 21) on either side of the row, one front (20) and one rear (21). The apparatus further includes a linkage (13) on each side of the row, axially connected to a pusher arm (8) and interconnected with each other via a spring (14), respectively. The pusher arms (8) are moved, in a closed position, forwards with the aid of a piston and cylinder assembly (19) and, in this movement, marshal out the first object (1) in the row. Thereafter, the pusher arms (8) open in that they enter into abutment against the front arrest pin (20). The linkage (13) ensures that the pusher arms (8) assume an open position. The pusher arms (8) thereafter move backwards in the open position with the aid of the piston and cylinder assembly (19). When the pusher arms (8) enter into abutment against the rear arrest pin (21), they begin to close and the linkages (13) ensure that the pusher arms (8) assume a closed position, whereafter the operational cycle may be repeated.

6 Claims, 3 Drawing Sheets

U.S. PATENT DOCUMENTS

| | | | |
|---|---|---|---|
| 3,732,966 A | | 5/1973 | Treiber |
| 4,404,837 A | * | 9/1983 | Allen et al. ................. 198/745 |
| 4,974,392 A | * | 12/1990 | Mondini ................... 198/468.1 |
| 5,902,092 A | * | 5/1999 | Erlandson et al. ..... 198/468.11 |

FOREIGN PATENT DOCUMENTS

| | | |
|---|---|---|
| EP | 0994029 | 4/2000 |
| GB | 1459519 | 12/1976 |

* cited by examiner

APPARATUS AND A METHOD FOR MARSHALLING OUT INDIVIDUAL OBJECTS FROM A ROW OF OBJECTS

FIELD OF THE INVENTION

The present invention relates to an apparatus for marshalling out individual objects from a row of objects, the apparatus including two pusher arms placed one on each side of the row of objects, the pusher arms being disposed to move reciprocally by means of a piston and cylinder assembly, and the pusher arms also being disposed to move between an open and a closed position.

The present invention also relates to a method of marshalling out individual objects from a row of objects, in that two pusher arms are, in a closed position, advanced by a piston and cylinder assembly, whereafter the pusher arms assume an open position and that, in this position, they are retracted by the piston and cylinder assembly.

BACKGROUND OF THE INVENTION

To be able to marshal out individually an object from a long row of such objects is often necessary in the handling of small objects which are, for example, to be applied onto something. A concrete example of this, for which the present invention is particularly suited, is the handling of opening arrangements before these are applied on a packaging container.

Packaging containers for liquid foods are often manufactured from a material web which, for example, may consist of a core layer of paper or paperboard to which are laminated different layers of thermoplastics and possibly aluminium. The material web is formed in a filling machine and sealed to form a tube which is filled with the desired product contents. The tube is transversely sealed repeatedly and is separated in these transverse seals to form individual packaging containers. After final forming, the packaging container often assumes a parallelepipedic configuration.

In order to facilitate the opening of these packaging containers, and also to make for reclosure of them, the packaging containers are provided with an outer opening arrangement. These opening arrangements are most generally applied to the packaging containers in special machines where one opening arrangement is applied over a prefabricated opening indication in the packaging container wall.

The opening arrangement may be of highly varying appearance. Normally, it consists of a flat portion which is intended to be placed against the packaging container. This flat portion often constitutes a unit together with a threaded opening and pouring spout. The opening arrangement also most generally displays a screw cap fixedly screwed in place on the pouring spout. Furthermore, the opening arrangement may include a membrane over the pouring spout, or alternatively other protection against unintentional or unauthorised opening of the packaging container.

The prefabricated opening arrangements are sorted in association with the special machine which applies the opening arrangements, or alternatively in the same machine. In order to be able to be handled in an efficient and exact manner before the application, the opening arrangements must be oriented in the same manner and preferably in a long row of opening arrangements correctly oriented.

The opening arrangements are thereafter to be advanced one by one in order to be applied on a packaging container. Marshalling out one opening arrangement from a long row of opening arrangements has hitherto been put into effect in that specific pushers displace out one opening arrangement at a time, 90° from the row of opening arrangements. This has been possible in that the prior art opening arrangements were provided with flat portions which have at least two straight edges, at 90° in relation to one another.

However, new opening arrangements have been designed in such a manner that the flat portion only has two straight edges which are parallel with each other. This novel type of opening arrangement has made it necessary to marshal out each individual opening arrangement straight out from the row of opening arrangements, i.e. in the longitudinal direction of the row.

SUMMARY OF THE INVENTION

One object of the present invention is to realise an apparatus and a method for marshalling out an object, such as an opening arrangement, from a long row of such objects, where the objects are marshalled out in the longitudinal direction of the row.

A further object of the present invention is that the apparatus be capable of handling the objects in an efficient and exact manner so that the objects will have the correct placing in the rest of their handling process.

These and other objects have been attained according to the present invention in that the apparatus of the type described by way of introduction has been given the characterising feature that the pusher arms are disposed to move between an open and a closed position by means of one device for each pusher arm, each device including a front and a rear arrest pin secured along the row of objects, and a linkage which is axially interconnected with a pusher arm and which is spring-biased connected to the linkage at the second pusher arm.

These and other objects have also been attained in that the method of the type described by way of introduction has been given the characterising feature that the pusher arms begin to open when they each reach a front arrest pin, and that two linkages bring the pusher arms to an open position, each linkage axially connected with a pusher arm and connected to one another by means of a spring, and that the pusher arms begin to close when they each reach a rear arrest. pin and that the linkages bring the pusher arms to a closed position.

Preferred embodiments of the present invention have further been given the characterising features as set forth in the appended subclaims.

BRIEF DESCRIPTION OF THE DRAWINGS

One preferred embodiment of the present invention will now be described in greater detail hereinbelow, with reference to the accompanying Drawings, in which.

The accompanying Drawings show only those parts and details essential to an understanding of the present invention, and the positioning of the apparatus in an applicator machine—well known to a person skilled in the art—has been omitted.

DETAILED DESCRIPTION OF THE INVENTION

Figure 1:
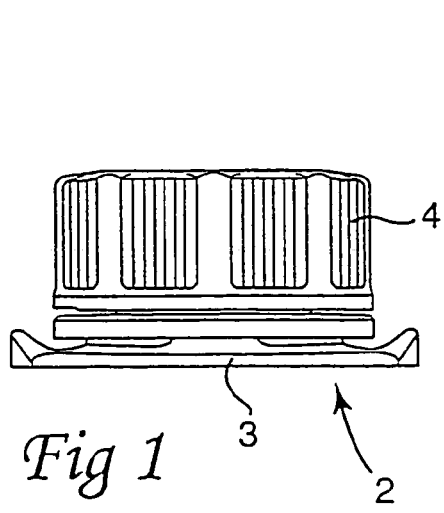
FIG. 1 is a side elevation of an object for which the apparatus according to the present invention may be employed.
Figure 2:
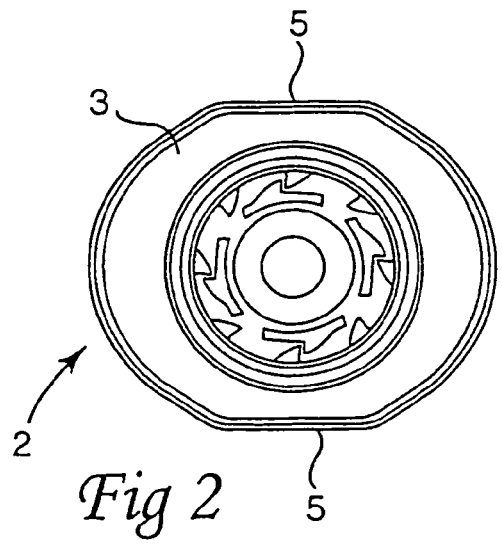
FIG. 2 is a top plan view of an object for which the apparatus according to the present invention may be employed.

The apparatus and the method according to the present invention are intended to be used for marshalling out individual objects 1 from a row of such objects 1. An object 1, may, for example, consist of an opening arrangement 2 as is apparent from FIGS. 1 and 2.

The opening arrangement 2 is intended to be applied on a packaging container (not shown). The packaging container may be of the type which is of parallelepipedic configuration and which is manufactured from a material web of paper or paperboard, laminated with thermoplastic and possibly aluminium foil. The material web is formed into a tube and longitudinally sealed in a filling machine. The material tube is filled with the intended contents, whereafter the tube is repeatedly sealed transversely over and is severed in these transverse seals. After final forming, the packaging container departs from the filling machine.

With a view to facilitating access to the contents and making for reclosure of the packaging container, this may be provided with an outer opening arrangement 2 which is applied on the upper side of the packaging container in a special applicator machine. The opening arrangement 2 is applied over a prefabricated opening indication in the packaging container which is covered by a layer of the material web, or alternatively an exteriorly applied covering strip.

The opening arrangement 2 has a flat portion 3 which is intended to be applied against the packaging container. The flat portion 3 most generally comprises a unit together with a threaded pouring spout. A screw cap 4 is applied on the threaded pouring spout and interlocks in mesh with the threads of the pouring spout. The opening arrangement 2 may also include different types of protection in order to prevent the screw cap 4 from being unintentionally opened. Similarly, the opening arrangement 2 may include means for penetrating the prefabricated opening indication in the packaging container. In the preferred embodiment of the present invention, the screw cap 4 of the opening arrangement 2 has cylindrical cross section and the flat portion 3 has two straight edges 5 parallel with each other.

Figure 4:
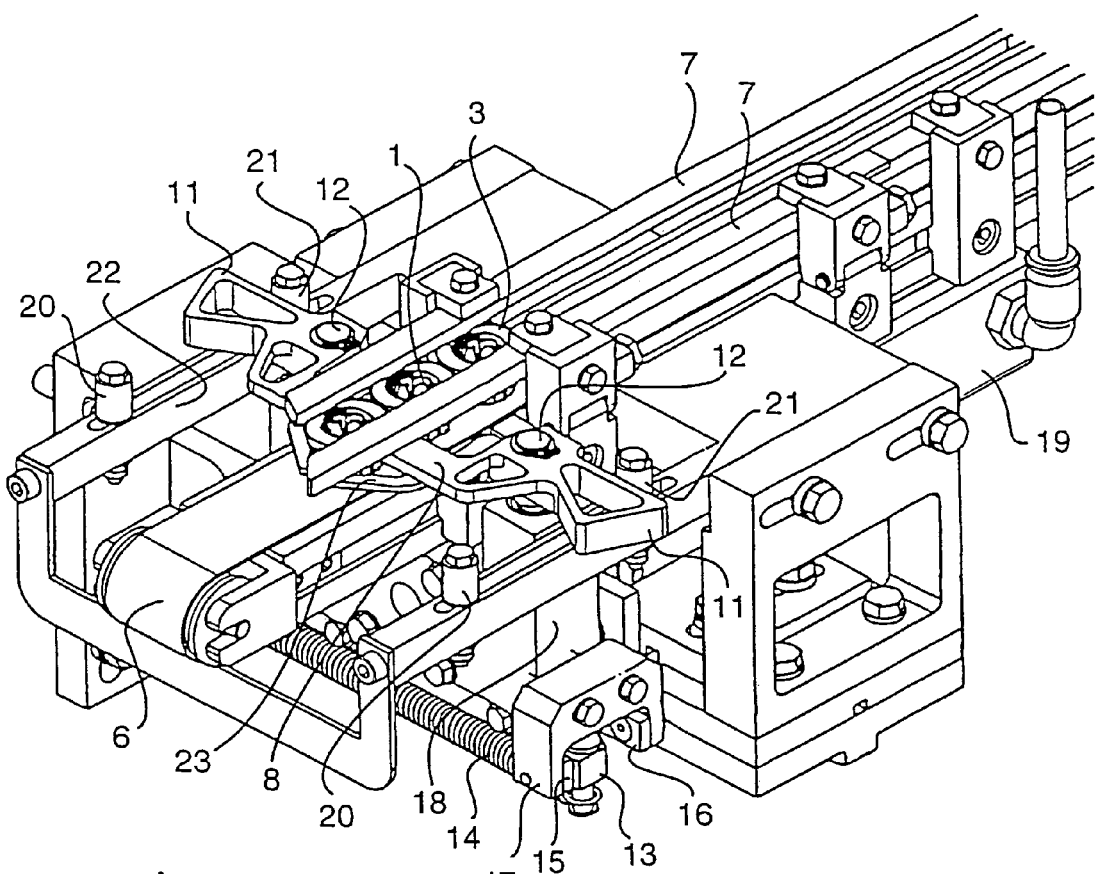
FIG. 4 shows an apparatus according to the present invention.

The objects 1, i.e. the opening arrangements 2, are sorted before or in the special applicator machine so that all objects 1 are oriented in the same manner, both in the vertical plane and in the lateral plane. In the preferred embodiment, this implies that the objects 1 are oriented in a long row with the flat portion 3 upwards and the two straight edges 5 in the longitudinal direction of the row. FIG. 4 shows a number of objects 1 in an apparatus according to the present invention.

The row of objects 1 is fed into the apparatus by means of a conveyor 6 which consists of an endless, driven belt on which the objects 1 rest. The conveyor 6 is driven continuously in the preferred embodiment, but it may also be driven intermittently. Alternatively, the objects 1 may be fed into the apparatus on a sloping path, where the objects 1 slide down by force of gravity. The objects 1, correctly oriented, are guided into the apparatus with the aid of guide rails 7 placed on both sides of the row of objects 1 and positioned such that the straight edges 5 of the objects 1 slide against the guide rails 7. The guide rails 7 ensure that the objects 1, i.e. the opening arrangements 2, are kept in the correct position so that they cannot "climb on" each other or rotate in the row.

Figure 3:
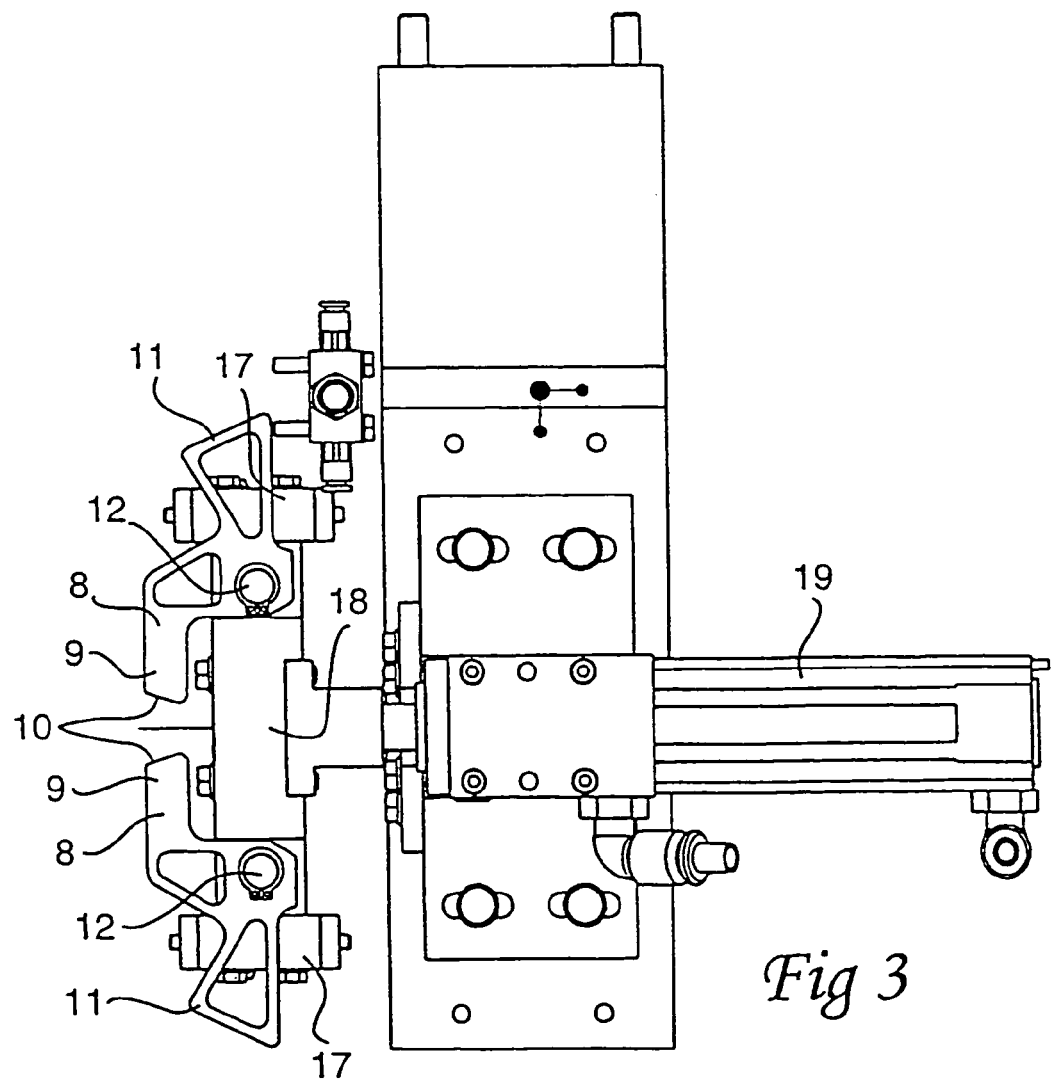
FIG. 3 is a top plan view of an apparatus according to the present invention.

The apparatus according to the present invention, as is apparent from FIGS. 3 and 4, includes two pusher arms 8 placed one on each side of the row of objects 1. The pusher arms 8 have a front portion 9 facing in towards the row of objects 1, and having a bevelled edge 10 which makes it possible for the pusher arms 8 to place themselves behind the first object 1 in the row without disturbing the objects 1. The pusher arms 8 also have a rear portion 11 which extends away from the row of objects 1. Each pusher arm is journalled in a shaft 12.

On the same shaft 12 in which each pusher arm 8 is journalled, there is also a linkage 13. The linkages 13 on each side of the row are moreover interconnected with each other by means of a spring 14. The linkages 13 may move between two arrest positions which are constituted by a front arrest heel 15 and a rear arrest heel 16. In the preferred embodiment, the arrest heels 15, 16 constitute one member 17 formed as a yoke. Alternatively, the arrest heels 15, 16 may consist of separate parts.

The shafts 12 for the pusher arms 8 and the linkages 13 are both secured on a member 18 which is reciprocally movable in the longitudinal direction of the row. The reciprocating movement is realised by means of a piston and cylinder assembly 19. The piston and cylinder assembly 19 may be pneumatic or hydraulic.

The apparatus also includes a front arrest pin 20 on each side of the row of objects 1 and a rear arrest pin 21 on each side of the row. The arrest pins 20, 21 are fixedly secured in relation to the moving pusher arms 8 and, in the preferred embodiment, are secured on the frame 22 of the conveyor 6. The arrest pins 20, 21 may be adjusted in the longitudinal direction of the row.

In the preferred embodiment of the invention, there are moreover one or two arrest fingers 23 which retain the first object 1 in the row until such time as the pusher arms 8 move forwards. The arrest fingers 23 are spring-biased.

The objects 1, for example the opening arrangements 2, which are to be applied on the packaging container, enter into the apparatus on a continuously driven conveyor 6. Alternatively, the conveyor 6 is driven intermittently or the objects may be conveyed on a sloping path. All of the objects are oriented in the same manner and they are guided by the guide rails 7 so that they are kept in this position throughout their entire passage through the apparatus. Since the conveyor 6 in the preferred embodiment constantly drives the row of objects 1 forwards, there is, in the front end of the conveyor 6, a mechanical arrest member which may consist of one or more spring-biased arrest fingers 23.

FIG. 4 shows the apparatus in the starting position where the first object 1 is retained by the arrest fingers 23 and the pusher arms 8 are located in a closed position behind the first object 1. The linkages 13 are located in the front arrest position, so that they abut against the front arrest heel 15.

Figure 6:
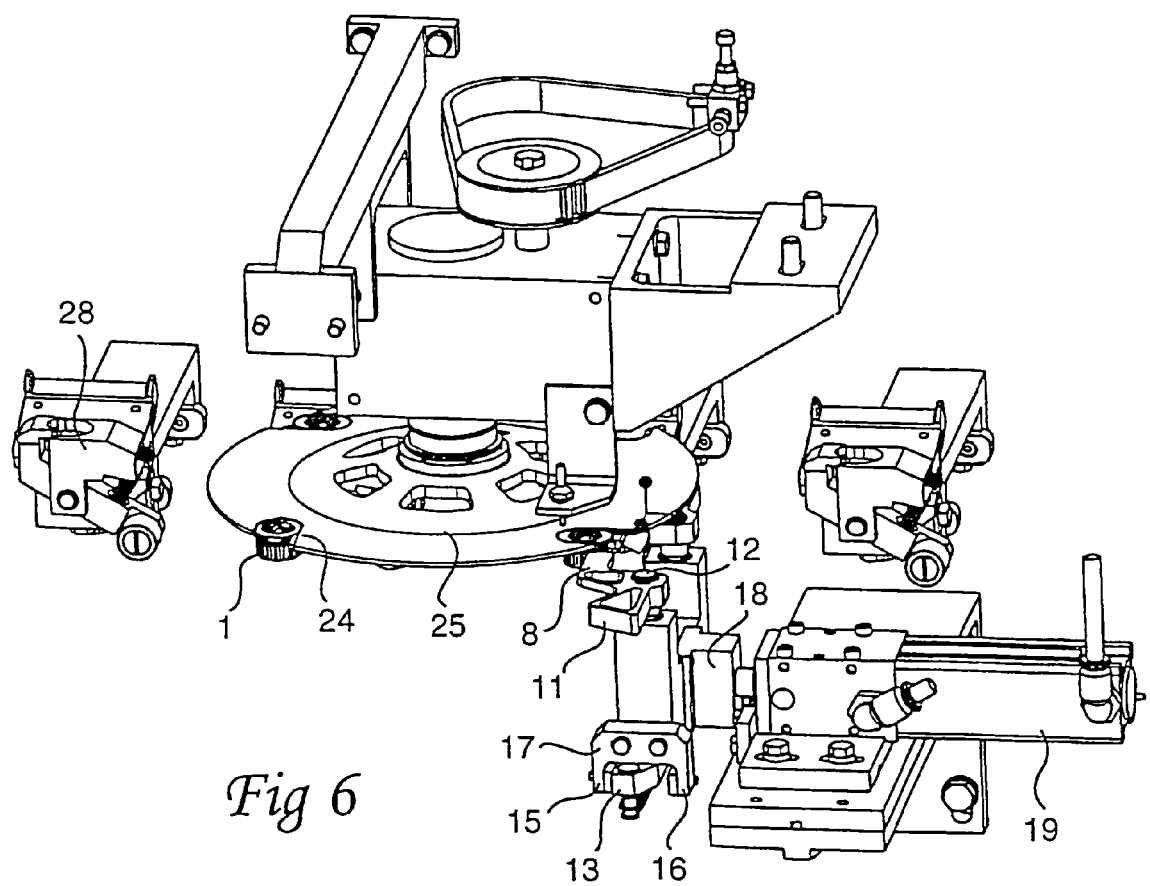
FIG. 6 shows the apparatus in relation to a part of the remaining equipment in an applicator machine.

Thereafter, the pusher arms 8 move forwards so that they marshal out the first object 1 from the row of objects 1. The object 1 is marshalled out in the longitudinal direction of the row. The pusher arms 8 move in that the piston and cylinder assembly 19 executes a positive stroke. As shown in FIG. 6, the object 1 is moved into a groove 24 in an indexing wheel 25.

Figure 5:
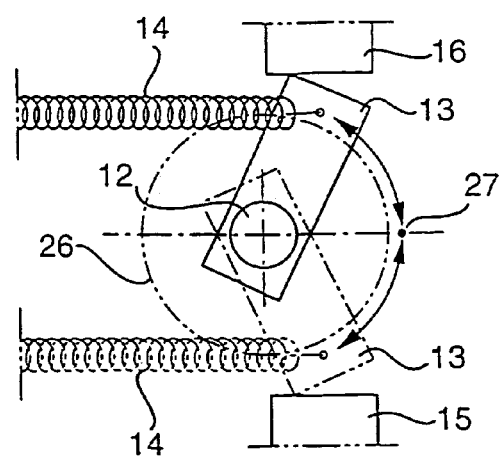
FIG. 5 is a schematic illustration of a part included in the apparatus.

Approximately at the same time as the object 1 arrives in the groove 24 in the indexing wheel 25, the rear portion 11 of the pusher arms 8 will enter into abutment against the front arrest pins 20 so that the pusher arms 8 begin to open. The linkages 13 secured on the common shaft 12 begin to move along an imaginary circle 26 which is illustrated in FIG. 5. When the linkages 13, which are held together by the spring 14, pass a point 27, the spring 14 strives to contract and the linkage 13 is drawn distinctly against the rear arrest heel 16. When the linkage 13 stops against the arrest heel 16, the pusher arms 8 are located in the open position.

The piston and cylinder assembly 19 thereafter executes its negative stroke and the pusher arms 8 will then move backwards in the open state. Immediately before the stoke of the piston and cylinder assembly 19 is completed, the rear portion 11 of the pusher arms 8 will abut against the rear arrest pins 21 and the pusher arms 8 begin to close. Each linkage 13 once again begins to move along the imaginary circle 26 and when it passes the point 27 the linkage 13 will be drawn against the front arrest heel 15. The pusher arms are once again closed, now behind the first object 1 in the row which had been moved forwards towards the arrest fingers 23 when the first object 1 was marshalled out from the row. The apparatus is now once again in its starting position and the cycle may be repeated.

When an object 1 has been moved into the indexing wheel 25, the wheel will move with the object 1 secured in a groove 24. In the different indexings that the wheel executes, the object, i.e. the opening arrangement 2, will be provided with hotmelt which is sprayed on the flat portion 3 of the opening arrangement. The wheel 25 moves further and the opening arrangement 2 provided with hotmelt is passed over to a linkage arm 28. The linkage arm 28 is secured on a chain (not shown) which passes the indexing wheel 25. The linkage arms 28 move the opening arrangement 2 further for application on a packaging container which passes through the applicator machine.

The present invention realises an apparatus and a method for marshalling out one individual object at a time from a row of objects. The objects are marshalled out from the row in the longitudinal direction of the row and, by pusher arms which, on the one hand, move forwards in a closed position and which, on the other hand, move backwards in an open position, there will be obtained a rapid and distinct transfer of the objects to the next workstation, for example in an applicator machine for opening arrangements.

What is claimed is:

1. An apparatus for marshalling out individual objects from a row of objects, the apparatus including two pusher arms placed one on each side of the row of objects, the pusher arms being disposed to move reciprocally by means of a piston and cylinder assembly, and the pusher arms also being disposed to move between an open and a closed position, wherein the pusher arms are disposed to move between an open and a closed position by means of one device for each pusher arm, each device including a front and a rear arrest pin, secured along the row of objects, and a linkage which is axially interconnected with a pusher arm and which is spring-biased interconnected with the linkage at the second pusher arm.

2. The apparatus as claimed in claim 1, wherein the objects consist of opening arrangements.

3. The apparatus as claimed in claim 1, wherein the pusher arms have a front portion disposed to marshal out the objects, and a rear portion disposed so as to enter into abutment against the arrest pins.

4. A method of marshalling out individual objects from a row of objects wherein two pusher arms, in a closed position, are protracted by a piston and cylinder assembly, whereafter the pusher arms assume an open position and, in this position, are retracted by the piston and cylinder assembly, wherein said pusher arms begin to open when they each reach a front arrest pin; wherein two linkages bring the pusher arms to an open position, each linkage being axially connected to one pusher arm and interconnected to one another by means of a spring; and wherein said pusher arms begin to close when they each reach a rear arrest pin and said linkages bring said pusher arms to a closed position.

5. The method as claimed in claim 4, wherein said pusher arms reach their open position when said linkages enter into abutment against a rear arrest heel and said pusher arms reach their closed position when said linkages abut against a front arrest heel.

6. The method as claimed in claim 5, wherein said linkages move along an imaginary circle, passing a point where the spring strives to contract, whereupon said linkage is drawn towards each respective arrest heel.

* * * * *